US010486271B2

(12) United States Patent
Veldsman et al.

(10) Patent No.: US 10,486,271 B2
(45) Date of Patent: Nov. 26, 2019

(54) WELDING APPARATUS

(71) Applicant: LINDE AKTIENGESELLSCHAFT, Munich (DE)

(72) Inventors: Walter Mark Veldsman, Guildford (GB); Roger O'Brien, North Shields (GB)

(73) Assignee: LINDE AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/319,953

(22) PCT Filed: Jun. 22, 2015

(86) PCT No.: PCT/GB2015/000193
§ 371 (c)(1),
(2) Date: Dec. 19, 2016

(87) PCT Pub. No.: WO2015/193633
PCT Pub. Date: Dec. 23, 2015

(65) Prior Publication Data
US 2017/0120398 A1 May 4, 2017

(30) Foreign Application Priority Data
Jun. 20, 2014 (GB) .................................. 1411098.5

(51) Int. Cl.
*B23K 37/00* (2006.01)
*B23K 9/32* (2006.01)
*B23K 26/70* (2014.01)

(52) U.S. Cl.
CPC .............. *B23K 37/003* (2013.01); *B23K 9/32* (2013.01); *B23K 26/703* (2015.10)

(58) Field of Classification Search
CPC ....... B23K 9/32; B23K 26/703; B23K 37/003
(Continued)

(56) References Cited

U.S. PATENT DOCUMENTS 4,158,763 A * 6/1979 Moerke .................. B23K 9/295
219/137.42
6,555,779 B1 * 4/2003 Obana .................. B23K 9/0061
219/121.63
(Continued)

FOREIGN PATENT DOCUMENTS

JP    S 58205687 A    11/1983
JP    H08155650 A     6/1996
WO   WO 2012/101399 A1  8/2012

*Primary Examiner* — Alexander M Valvis
(74) *Attorney, Agent, or Firm* — Millen White Zelano & Branigan, PC

(57) ABSTRACT

A welding apparatus having a welding tool and a weld cooling apparatus for forced cooling of the weld zone. The welding tool has a welding nozzle with a longitudinal axis, and the weld cooling apparatus uses a source of $CO_2$ as the coolant. A coolant delivery conduit is arranged to move with the welding tool and has a first tube with a longitudinal axis that extends alongside the welding tool, and a second tube with a longitudinal axis extending downwardly and away from the welding tool. A coolant nozzle is located at the end of the second tube to eject coolant at the weld zone. The coolant nozzle outlet is spaced from the workpiece and arranged to direct a jet of coolant behind the welding tool onto the weld zone at least 10 mm from the longitudinal axis of the first tube.

23 Claims, 12 Drawing Sheets

(58) Field of Classification Search
USPC .......................................... 219/137.62, 137.9
See application file for complete search history.

(56) References Cited

U.S. PATENT DOCUMENTS

| | | | | |
|---|---|---|---|---|
| 7,067,759 | B2* | 6/2006 | Gabzdyl | B23K 9/16 |
| | | | | 219/121.64 |
| 7,326,880 | B2* | 2/2008 | Takeshita | B23K 9/287 |
| | | | | 219/124.34 |
| 8,450,631 | B2* | 5/2013 | Sato | B23K 9/0061 |
| | | | | 219/121.21 |
| 2001/0054639 | A1 | 12/2001 | Gabzdyl | |
| 2009/0014422 | A1* | 1/2009 | Miklos | B23K 5/213 |
| | | | | 219/75 |

* cited by examiner

WELDING APPARATUS

The present invention relates to a welding apparatus, more particularly to a welding apparatus comprising a welding tool and a weld cooling apparatus for the forced cooling of a heated weld zone in a workpiece being welded by the welding tool.

During the thermal welding of metallic workpieces a high heat input is required to generate an acceptable weld. However, this high heat input has a disadvantage that the thermal stresses generated by the welding process can cause significant levels of distortion of the workpiece being welded. Materials such as mild steel and its alloys, alloy steels and its alloys, aluminium and its alloys, stainless steel and its alloys, titanium and its alloys nickel and its alloys are prone to distortion.

It is known to provide forced cooling to the heated weld zone of a work during thermal joining processes (including solid phase welding, for example, friction stir welding), particularly arc welding processes, so as to reduce or eliminate residual stresses generated by the welding process and/or to reduce or eliminate distortion and/or to modify the microstructure of the weld metal.

Particularly, it is known to provide forced cooling by using a jet of cryogen, for example carbon dioxide, from a nozzle head. The requirements of the cooling nozzle head are to typically provide a jet of solid, mixed phase, or liquid carbon dioxide of sufficient quantity to a spot, at a required distance behind the welding arc. The distance behind the welding arc is limited by the need to avoid or minimise disturbance to the weld pool and/or welding arc so that the weld quality is not compromised.

It is particularly desirable to provide forced cooling on a top-side/same-side arrangement, for example by delivering coolant through a nozzle mounted on a carriage behind the welding torch. Such an arrangement enables the integration of the cooling nozzle and welding gun onto a robotic welding system. However, although such arrangements for example as described in JPS 57181791 allow simultaneous welding and cooling of simple two-dimensional components, they do not allow ready access by the robotic arm to small and/or intricate three-dimensional geometries which require welding. As a result, it is not possible to undertake simultaneous welding and cooling of complex or difficult to reach geometries, leading to possible distortion of welded components having such geometries.

According to a first aspect of the present invention, there is provided a welding apparatus comprising a welding tool and a weld cooling apparatus for the forced cooling of a heated weld zone in a workpiece being welded by the welding tool, the welding tool having a welding nozzle with a longitudinal axis, and the weld cooling apparatus comprising a source of $CO_2$ as the coolant; at least one coolant delivery conduit arranged to move with the welding tool comprising a first tube portion having a longitudinal axis and extending alongside the welding tool and a second tube portion having a longitudinal axis and extending, in use, downwardly and away from the welding tool, and at least one coolant nozzle at a distal end of the second tube portion having a longitudinal axis and an outlet for ejecting cryogenic coolant at the heated weld zone, wherein the second tube portion is arranged such that the coolant nozzle outlet is spaced, in use, from the workpiece so as to direct a jet of coolant behind the welding tool onto the weld zone, and at least 10 mm from the longitudinal axis of the first tube portion.

With this arrangement, the coolant delivery conduit can be positioned close to the welding nozzle to minimise size and allow the system to be easily manipulated to gain access to complex geometries while still allowing the coolant nozzle to be in a suitable location for directing coolant at the heated weld zone.

The terms "welding" and "weld" as used herein refer to any thermal joining method. The term "weld zone" as used herein refers to at least the region of the workpiece comprising the solidified weld metal. The term "tube" as used herein refers to any suitable channel or conduit, including but not limited to a cylindrical tube or pipe, or a channel formed through a housing.

In a preferred embodiment, the first tube portion and the second tube portion are arranged such that the coolant nozzle outlet is between 10 mm and 15 mm from the longitudinal axis of the first tube portion.

The first tube portion may be of any suitable cross-sectional shape or diameter. Preferably, the first tube portion has an outer diameter of less than 10 mm.

The first tube portion may extend alongside the welding tool at any suitable distance and/or at a distance which varies along the length of the first tube portion. In a preferred embodiment, the first tube portion is confined to an area extending around and at a distance of 10 mm from the welding nozzle. This ensures that the weld cooling apparatus does not significantly restrict the movement of the welding tool.

The coolant delivery conduit may be formed from a series of interconnected tubes which are welded or otherwise joined together to form the first and second tube portions. In a preferred embodiment, the at least one coolant delivery conduit comprises a cylindrical tube with a bend to form the first and second tube portions.

The term "cylindrical" used herein refers to a cylinder having any suitable cross-sectional shape, such as, but limited to, a circular, elliptical, square, or rectangular cross-section.

Preferably, the second tube portion is arranged such that the longitudinal axis of the at least one coolant nozzle is at an angle of 10 to 70 degrees, and more preferably at an angle of 45 to 55 degrees, to the longitudinal axis of the welding nozzle to direct coolant away from the welding nozzle. This reduces disturbance to the weld pool and/or welding arc and allows the coolant nozzle to be positioned closer to the welding nozzle for a given coolant jet position.

The angle of the at least one coolant nozzle may be fixed relative to the welding nozzle, for example by forming the second cylindrical tube portion from a pre-bent tube. Alternatively, the angle of the at least one coolant nozzle relative to the welding nozzle may be adjustable, for example by joining the first and second tube portions at an articulated elbow.

The coolant delivery conduit may be fixed to, or integral with, any suitable part of the welding tool, for example above the welding nozzle, or by fixing the second tube portion to the welding nozzle. Preferably, the first tube portion is fixed to, or integral with, the welding nozzle.

The flow of coolant may be controlled by any suitable means, such as an adjustable valve. In a preferred embodiment, the at least one coolant nozzle further comprises a removable flow regulator having a fixed diameter flow regulating orifice. This allows accurate control of coolant flow without the need for complex control mechanisms.

Preferably, the flow regulating orifice is arranged to limit the flow of coolant therethrough at a rate of between 0.2 kg/min and 15 kg/min.

The at least one coolant nozzle may comprise a single coolant nozzle, or a plurality of coolant nozzles which are parallel or divergent. In a preferred embodiment, the at least one coolant nozzle comprises a plurality of coolant nozzles arranged to direct converging flows of coolant at the heated weld zone. This increases the cooling capacity of the welding apparatus, allowing higher welding currents to be used and higher welding speeds to be achieved. In addition, having a plurality of coolant nozzles allows more flexibility in the manner in which coolant is applied, such that distortion may be minimised. For example, the coolant nozzles could be arranged to apply coolant parallel to the weld zone rather than directly onto it.

The at least one coolant delivery conduit may comprise a single conduit connected to all of the plurality of coolant nozzles. Alternatively, the at least one coolant delivery conduit may comprise a plurality of conduits each connected to one or more of the plurality of coolant nozzles. Preferably, the at least one coolant delivery conduit comprises a plurality of coolant delivery conduits, each connected to one of the plurality of coolant nozzles.

The welding apparatus may be used without the presence of a barrier between the at least one coolant nozzle and the welding nozzle. Preferably, the apparatus includes a compliant shield arranged, when in use, to form a barrier between the ejected coolant and the welding nozzle. This reduces the disturbance to the weld pool and/or welding arc which may otherwise be caused by expansion of coolant vapour towards the shielding gas.

The shield may be any suitable shape and may extend fully around the welding nozzle and/or the at least one coolant nozzle. Alternatively, the shield is arcuate and disposed around the welding nozzle or around the at least one coolant nozzle. The former arrangement is preferable where more than one coolant nozzle is used and the latter arrangement is preferable when the at least one coolant nozzle comprises a single coolant nozzle.

The shield may be non-releasably fixed to the coolant nozzle or the welding nozzle. Preferably, the shield is removably attached by a releasable clip. This allows easy replacement of a damaged shield.

Preferably, the $CO_2$ undergoes a change of state to a gas in operation of the weld cooling apparatus according to the invention. The term "gas" as used herein includes "vapour". The cryogenic coolant may be ejected at a temperature of minus 50° C. or less and is preferably solid as it is ejected. A jet of particles of solid carbon dioxide, in the form of a "snow" can be formed by passing a stream of liquid carbon dioxide at a pressure above its critical pressure through the nozzle. On expansion from the nozzle the liquid carbon dioxide undergoes a change of phase into a gas and a solid snow, the latter having a temperature of minus 78° C. This snow collects on the heat affected zone associated with the weld and extracts heat therefrom causing the snow to sublime. Because it collects on the surface of the heated weld zone and takes its enthalpy of sublimation from the heated weld zone, the solid carbon dioxide is far more effective than lower temperature cryogenic liquids such as liquid argon, liquid air, liquid nitrogen and liquid helium, which all tend to vaporise above the heat affected zone of the weld and are not able therefore to take much of their enthalpy of vaporisation directly from the heat affected zone. Solid carbon dioxide is also much more effective compared to water cooling in terms of reducing residual stress to reduce distortion.

According to a second aspect of the present invention, there is provided a weld cooling apparatus for use with a welding apparatus as described above, the weld cooling apparatus comprising at least one coolant delivery conduit movable with the welding tool and comprising a first tube portion having a longitudinal axis and arranged to extend alongside the welding tool and a second tube portion having a longitudinal axis and arranged to extend, in use, downwardly and away from the welding tool, and at least one coolant nozzle at a distal end of the second tube portion having a longitudinal axis and an outlet for ejecting cryogenic coolant at the heated weld zone, wherein the second tube portion is arranged such that the coolant nozzle outlet is at least 10 mm from the longitudinal axis of the first tube portion.

As with the first aspect of the present invention, when in use, the coolant delivery conduit can be positioned close to a welding nozzle to minimise size and allow the system to be easily manipulated to gain access to complex geometries while still allowing the coolant nozzle to be in a suitable location for directing coolant at the heated weld zone.

According to a third aspect of the present invention, there is provided a method of welding a workpiece using a welding apparatus according to a first aspect of the present invention, the method comprising moving the welding tool across the workpiece in order to generate the heated weld zone; and spraying a jet of $CO_2$ from the coolant nozzle from a location spaced from the workpiece onto the workpiece at a position in the heated weld zone behind the welding tool.

Preferably, the $CO_2$ is ejected at a temperature of −50° C. or less in order to provide a high level of cooling. The coolant is preferably ejected as a solid. This has the advantage referred to previously that the sublimation extracts heat energy from the weld zone.

Preferably, the cooling power of the coolant transmitted to the workpiece is 2-30 kW. This provides a high degree of targeting cooling which provides excellent reduction of residual stresses.

Preferably, the height of the nozzle above the workpiece is 5-15 mm and preferably 7-11 mm. This maintains the compact structure, while allowing space for the coolant to impinge on the workpiece without interference from the nozzle.

Preferably, the or each nozzle emits a jet of coolant which impinges on the workpiece in a zone which has a maximum width in a direction perpendicular to the direction of travel of the nozzle which is between 12 and 15 mm. More than one nozzle can be used to generate a wider cooling zone for thicker workpieces.

Preferably, the distance between the centre or the weld zone and the centre of a zone on the workpiece which is impinged by the coolant is between 30 and 50 mm.

Embodiments of the invention will now be described by way of example only with reference to the accompanying drawings, in which.

Figure 1:
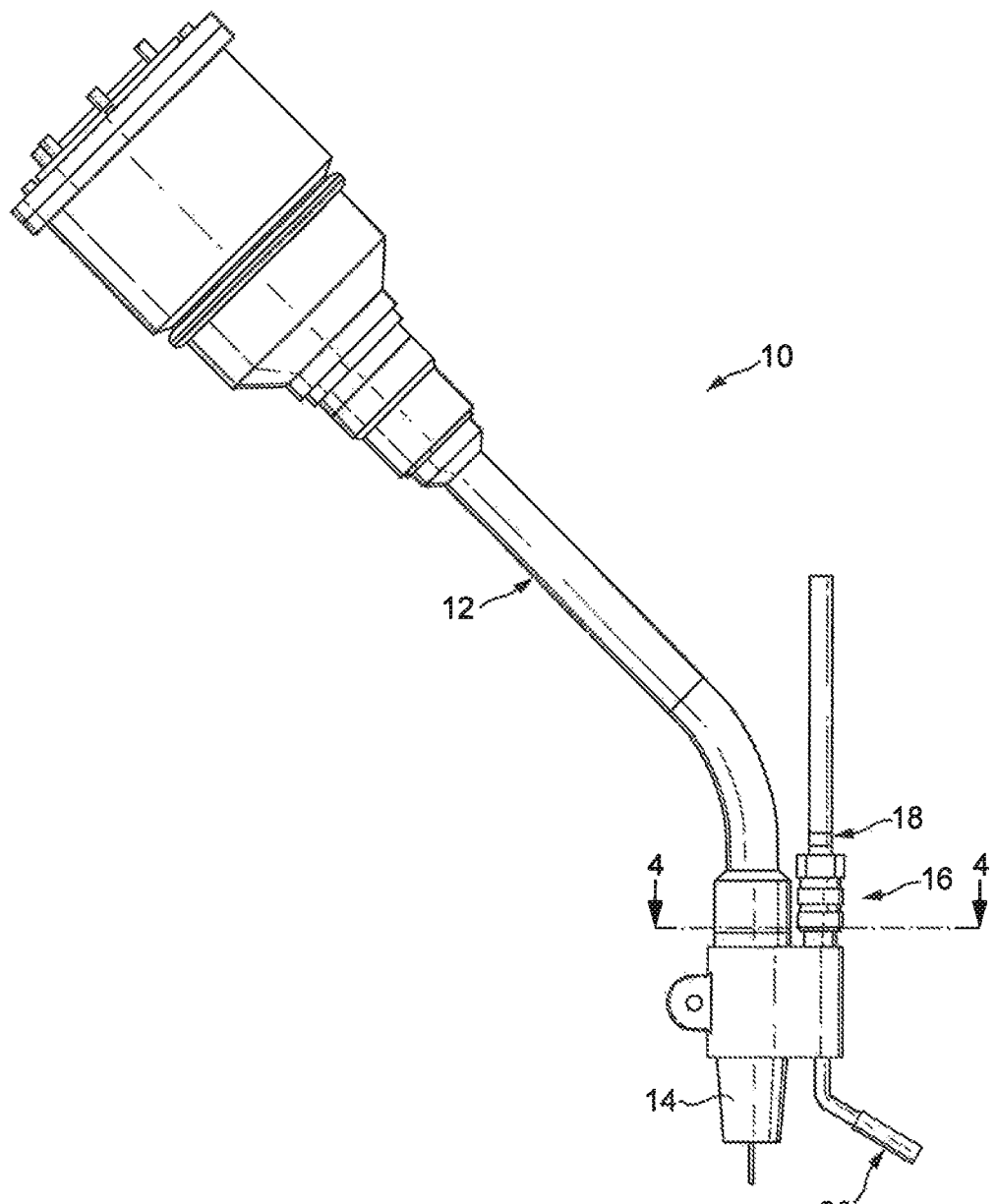
FIG. 1 is a side view of a welding apparatus according to a preferred embodiment of the present invention.
Figure 2:
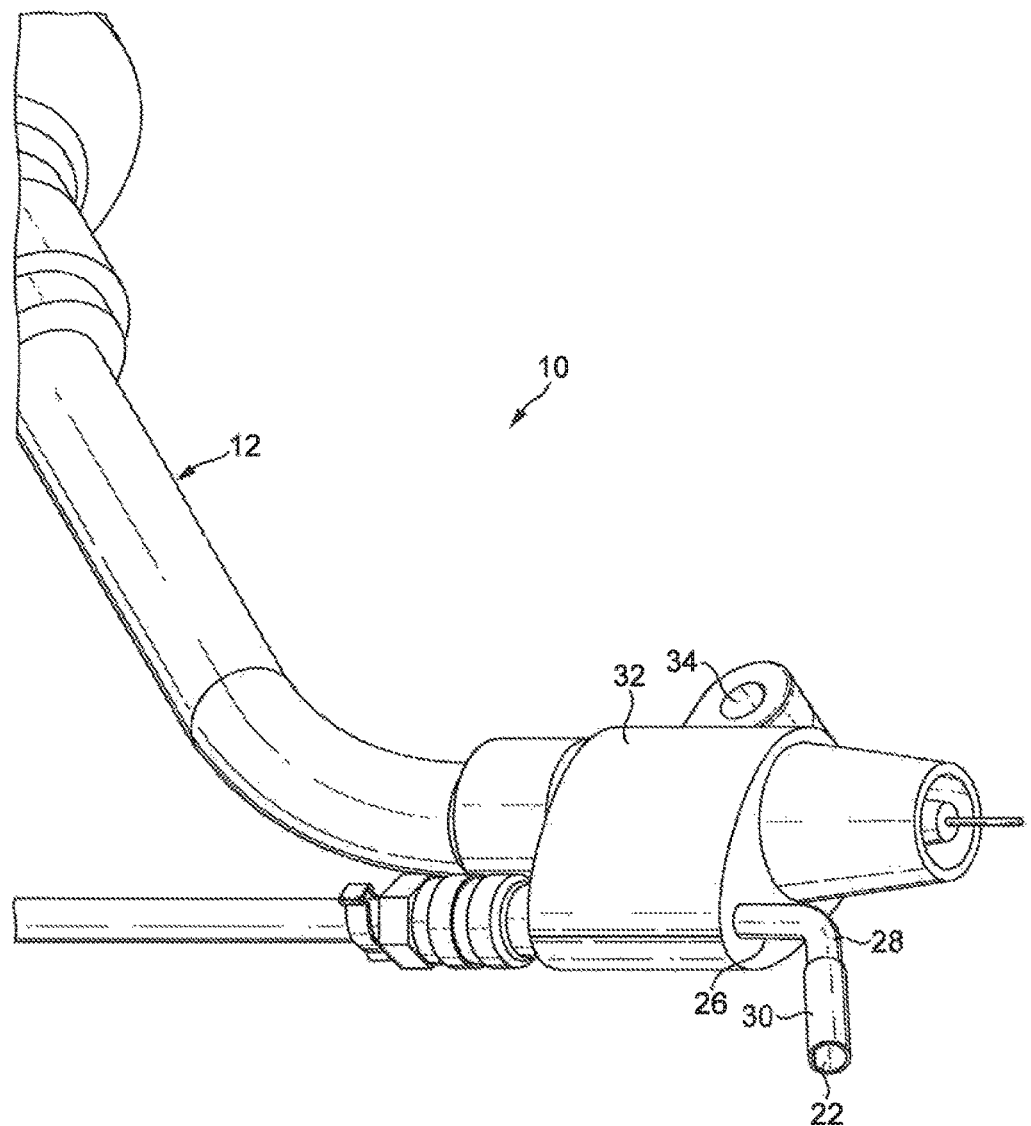
FIG. 2 is a bottom perspective view of the welding apparatus of FIG. 1.
Figure 3:
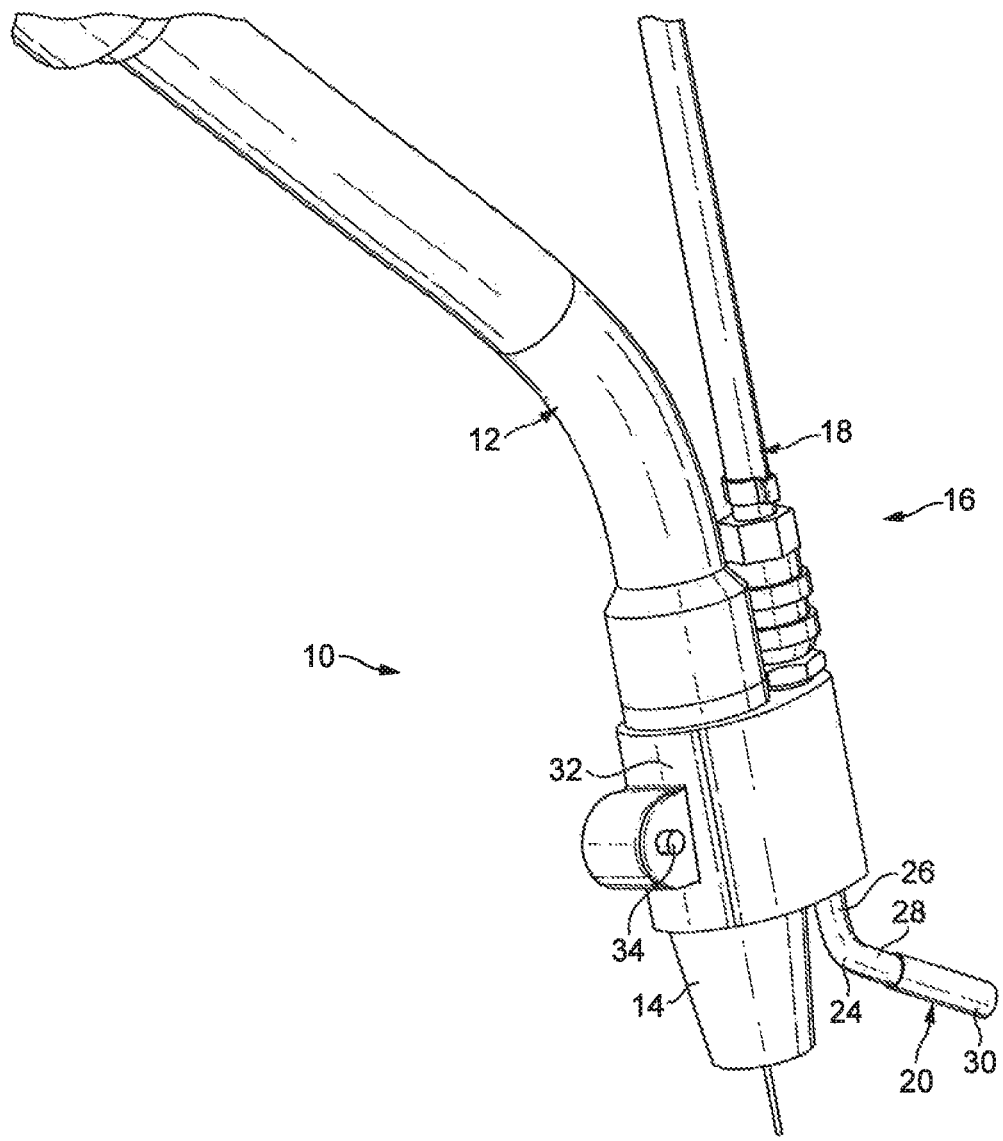
FIG. 3 is a side perspective view of the welding apparatus of FIG. 1.
Figure 4:
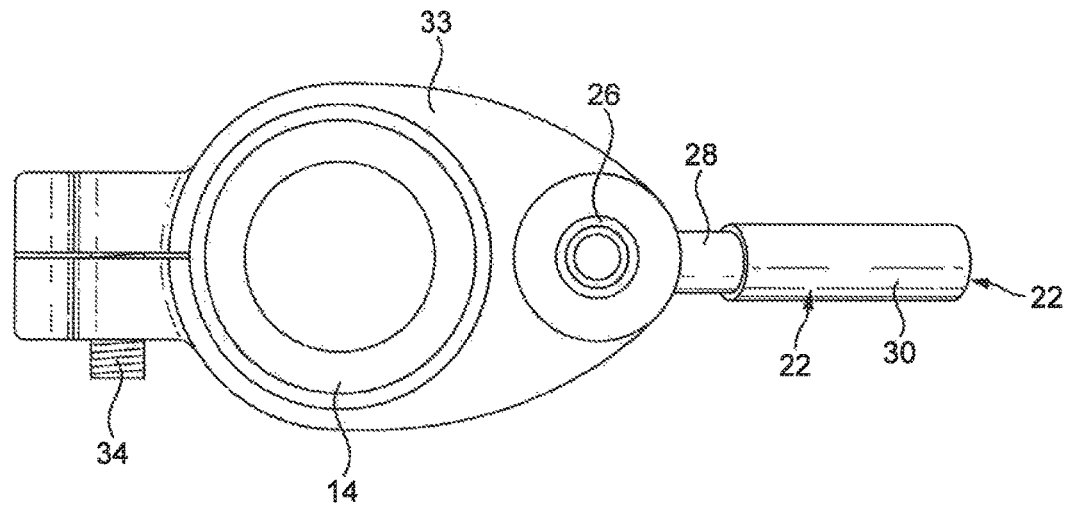
FIG. 4 is a cross-sectional view taken through line 4-4 of FIG. 1, with the internal components of the welding tool removed for clarity.

Referring to FIGS. 1 to 4, welding apparatus 10 comprises an arc welding tool 12 (such as a MIG welding torch) with a welding nozzle 14 and a weld cooling apparatus 16. The welding apparatus 10 is mounted to an industrial robot (not shown) to allow simultaneous and automated welding and cooling of a workpiece.

The weld cooling apparatus 16 includes a coolant delivery conduit 18, connected to a pressurised source of coolant (not shown). The coolant delivery conduit 18 comprises a cylindrical tube which is bent at an elbow 24 to form a first cylindrical tube portion 26 extending alongside the welding nozzle 14 and a second cylindrical tube portion 28 which extends downwardly and is angled away from the first cylindrical tube portion 26 and at the distal end of which is a coolant nozzle 20 with an outlet 22 for ejecting cryogenic coolant at a heated weld zone. The cylindrical tube can be formed from any suitable material, for example a stainless steel tube having an outer diameter of 8 mm. The coolant nozzle 20 includes a removable flow regulator 30, such as an Amal™ nozzle, which has a fixed diameter flow regulating orifice for regulating the flow rate and cooling power of the coolant nozzle 20. In this example, the coolant nozzle 20 is tapped to a 1BA thread (not shown) to allow the removable flow regulator 30 to be connected to the rest of the coolant nozzle 20. Alternatively, known Linde $CO_2$ snow nozzles (sold as part of the 'Lindespray™ Cooling System') can be incorporated in the place of the Amal nozzles onto or in the weld tool to effect the same outcomes.

The weld cooling apparatus 16 is mounted on the welding tool using a clamp 32 extending around both the welding nozzle 14 and the first cylindrical tube portion 26, such that the weld cooling apparatus 16 moves with and trails behind the welding tool 12. The clamp 32 includes a fastener, such as a bolt 34, to enable the weld cooling apparatus 16 to be securely yet releasably fixed to the welding tool 12. With this arrangement, the weld cooling apparatus 16 can be easily retrofitted to an existing welding tool 12. The clamp 32 holds the first cylindrical tube portion 26 alongside and substantially parallel to the welding nozzle 14 such that the first cylindrical tube portion 26 is confined to within 10 mm from the welding nozzle 14 to minimise the space occupied by the welding apparatus 10.

The weld cooling apparatus 16 may also include a refractory shield 36 (see FIG. 5) which is clipped onto and extends downwards from the nozzle 20. In this example, the shield 36 is arcuate and forms a segment of a ring rather than a complete ring, with its open side facing away from the welding nozzle 14 and with a central axis which is broadly parallel to the longitudinal axis of the welding nozzle 14. It will be appreciated that other shapes and orientations of shield 36 may be used, provided the shield 36 is arranged to form a barrier between the ejected coolant and the welding nozzle 14. The shield 36 is compliant and is formed from a high temperature resistant material.

The length of the second cylindrical tube portion 28 and the angle at which it extends can be selected depending on the specific requirements of the welding apparatus 10. Generally, the second cylindrical tube portion 28 should be arranged such that, in use, the coolant nozzle 20 directs coolant at a point 30 to 50 mm from the longitudinal axis of the welding nozzle 14. In this example, the second cylindrical tube portion 28 extends at a fixed angle of approximately 50 degrees to the nozzle axis such that the coolant nozzle outlet 22 is approximately 10 mm to 15 mm from the longitudinal axis of the first cylindrical tube portion 26.

Figure 5:
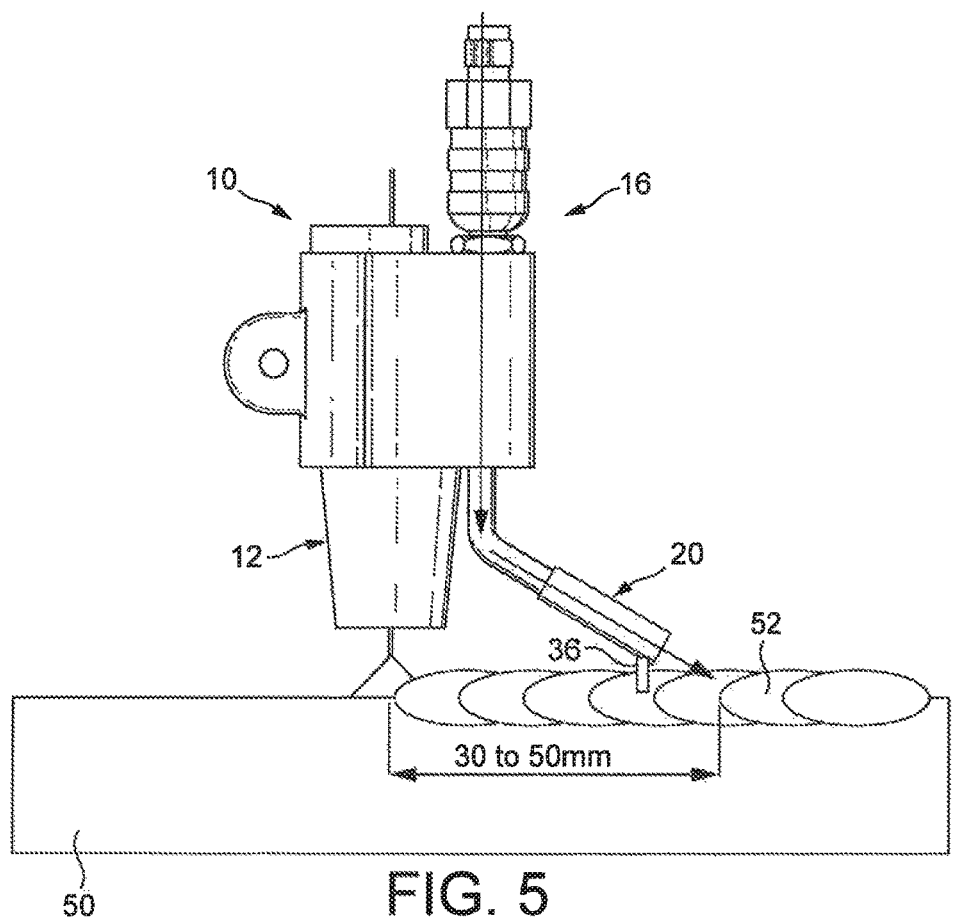
FIG. 5 is a schematic view of the welding apparatus of FIG. 1 being used to simultaneously weld and cool a workpiece.

FIG. 5 shows the welding apparatus 10 being used to simultaneously weld and cool a work 50.

In operation, the welding tool 12 and the weld cooling apparatus 16 are moved in unison over the work 50 being welded, with the welding nozzle 14 positioned relatively close to the work 50 and with the coolant nozzle 20 trailing the welding nozzle 14.

Figure 6:
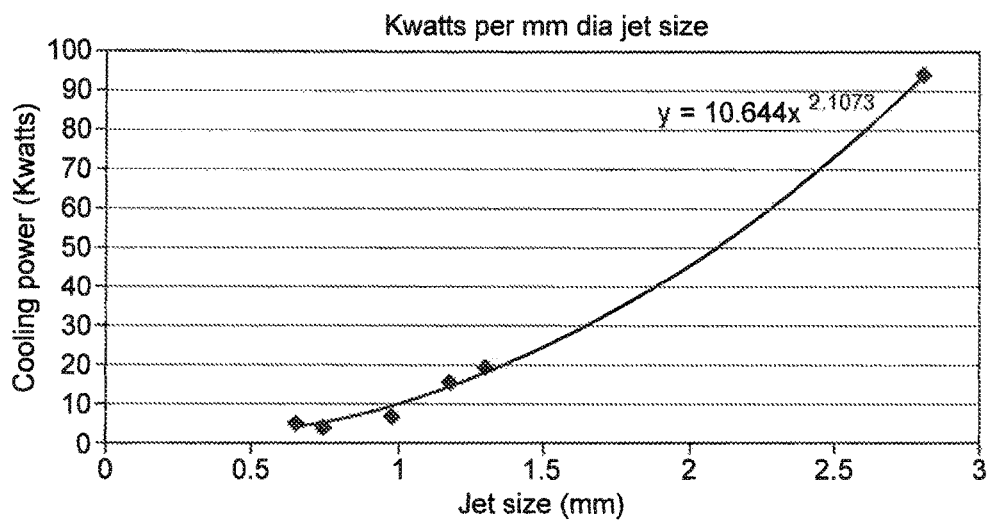
FIG. 6 is a graph illustrating the relationship between cooling power and jet size.
Figure 7:
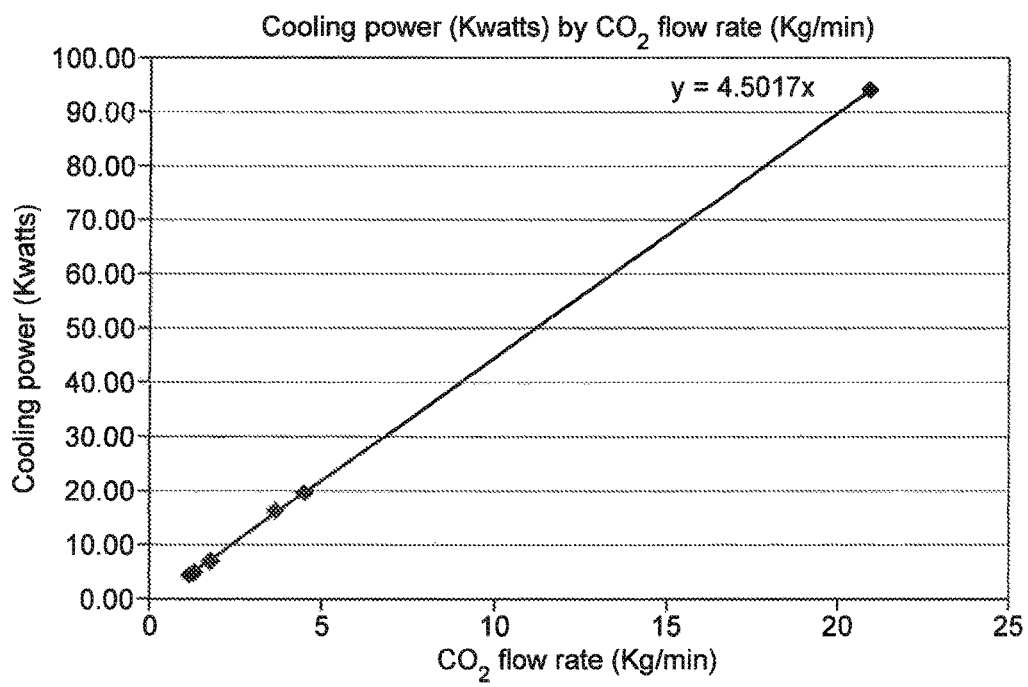
FIG. 7 is a graph illustrating the relationship between cooling power and carbon dioxide flow rate.
Figure 8:
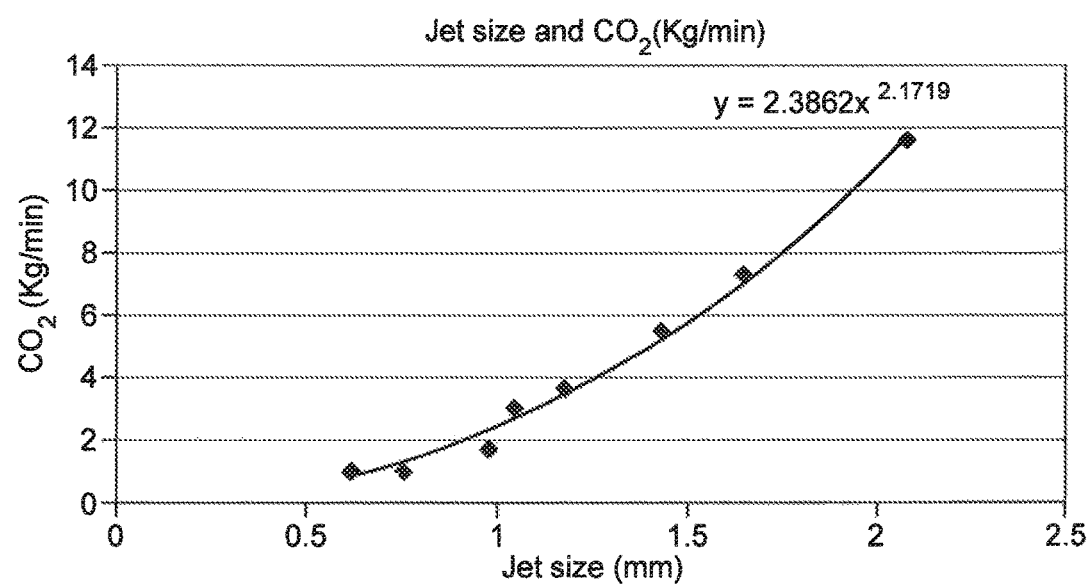
FIG. 8 is a graph illustrating the relationship between carbon dioxide flow rate and jet size.

During welding, a heated weld zone 52 is formed by the deposition of weld metal from the welding tool 12 on the work 50. A stream of liquid carbon dioxide, or other coolant, under pressure (typically in the range of 15 to 25 bar but can also be up to 70 bar pressure) is passed from a source (not shown) to the coolant nozzle 20 via the coolant delivery conduit 18. The flow rate of the coolant is typically between 0.2 kg/min and 15 kg/min and may be varied by changing the flow regulator 30 to one with a different diameter orifice, depending on the required cooling power. The relationship between jet size, $CO_2$ flow rate and cooling power can be seen in FIGS. 6 to 8. A suitable flow rate of the coolant is 0.37 to 15 kg/min. As the liquid carbon dioxide passes through the outlet 22 of the nozzle 20, it is converted into a jet of gas carrying particles of solid carbon dioxide. This jet deposits sold carbon dioxide on the heated weld zone 52 as the nozzle 20 follows the welding tool 12. The cooling region is typically between 10 and 60 mm behind the welding arc, for example from 30 to 50 mm.

The liquid carbon dioxide is supplied at a pressure such that solid carbon dioxide will not be formed until the pressure is released as a consequence of the ejection of the carbon dioxide through the coolant nozzle 20. The coolant nozzle 20 is arranged to eject the pressurised stream of carbon dioxide at a high, preferably supersonic, velocity. Accordingly, the coolant nozzle 20 is preferably a Laval nozzle which has a characteristic convergent-divergent bore at its distal end. It is as the liquid carbon dioxide is expanded rapidly in the divergent section of the Laval nozzle that a part of it solidifies. At optimal conditions about 40% is converted to solid and the rest to gas. The solid particles are accelerated by the gaseous component. One advantage of employing a high velocity jet of cryogenic coolant is that it has the momentum necessary to penetrate any blanket of vapour that forms in operation over the heated welded zone 52.

The angle of the second cylindrical tube portion 28 and the nozzle 20 is such that the jet of coolant is directed away from the welding nozzle 14, reducing the amount of coolant gas, carbon dioxide, which may disturb or interfere with the shielding gas of the welding tool 12. The shield 36 provides a barrier to restrict the flow of coolant gas towards the welding nozzle 14, further reducing the amount of coolant gas which may disturb or interfere with the shielding gas. Thus, an advantage of the shield 36 is that the risk of weld defects being formed in the work 50 is significantly reduced.

Figure 9:
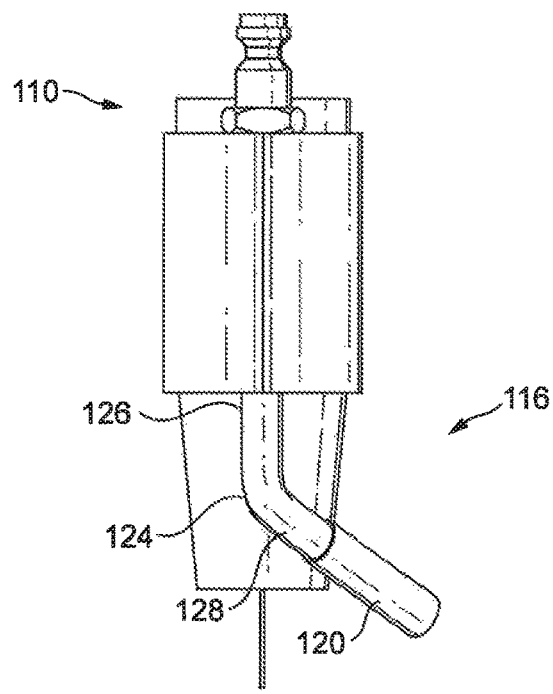
FIG. 9 is side view of a first alternative embodiment of welding apparatus according to the present invention, with the upper components of the welding tool and weld cooling apparatus removed for clarity.
Figure 10:
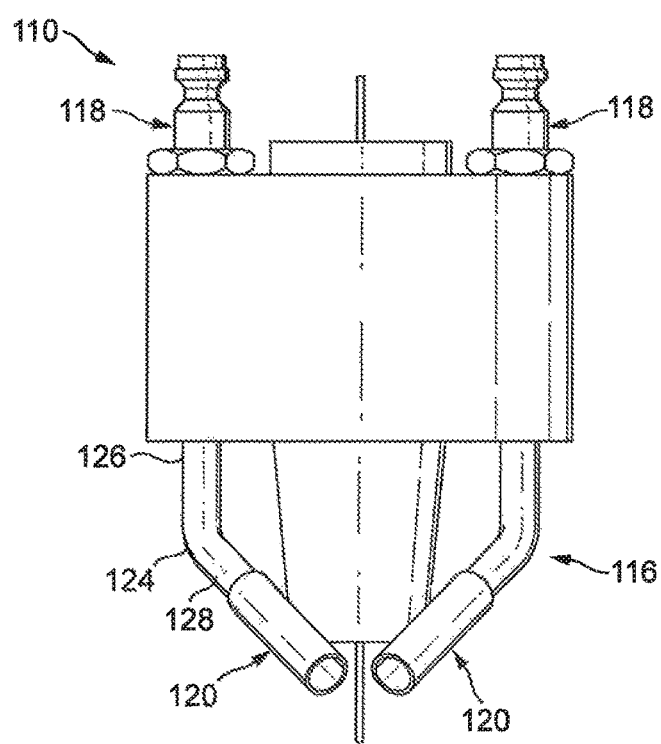
FIG. 10 is a rear view of the welding apparatus of FIG. 9.
Figure 11:
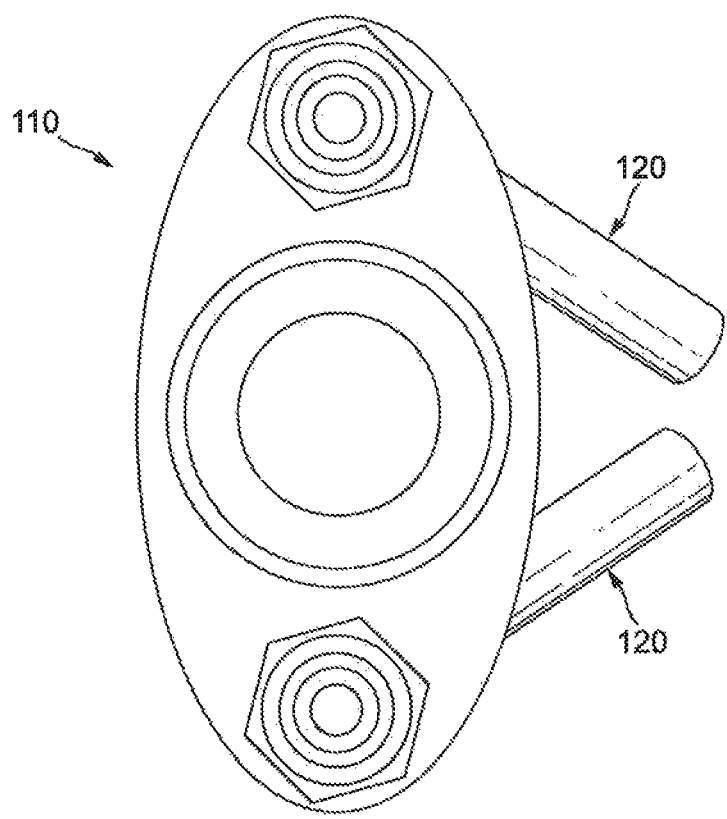
FIG. 11 is a plan view of the welding apparatus of FIG. 9, with the internal components of the welding tool removed for clarity.
Figure 12:
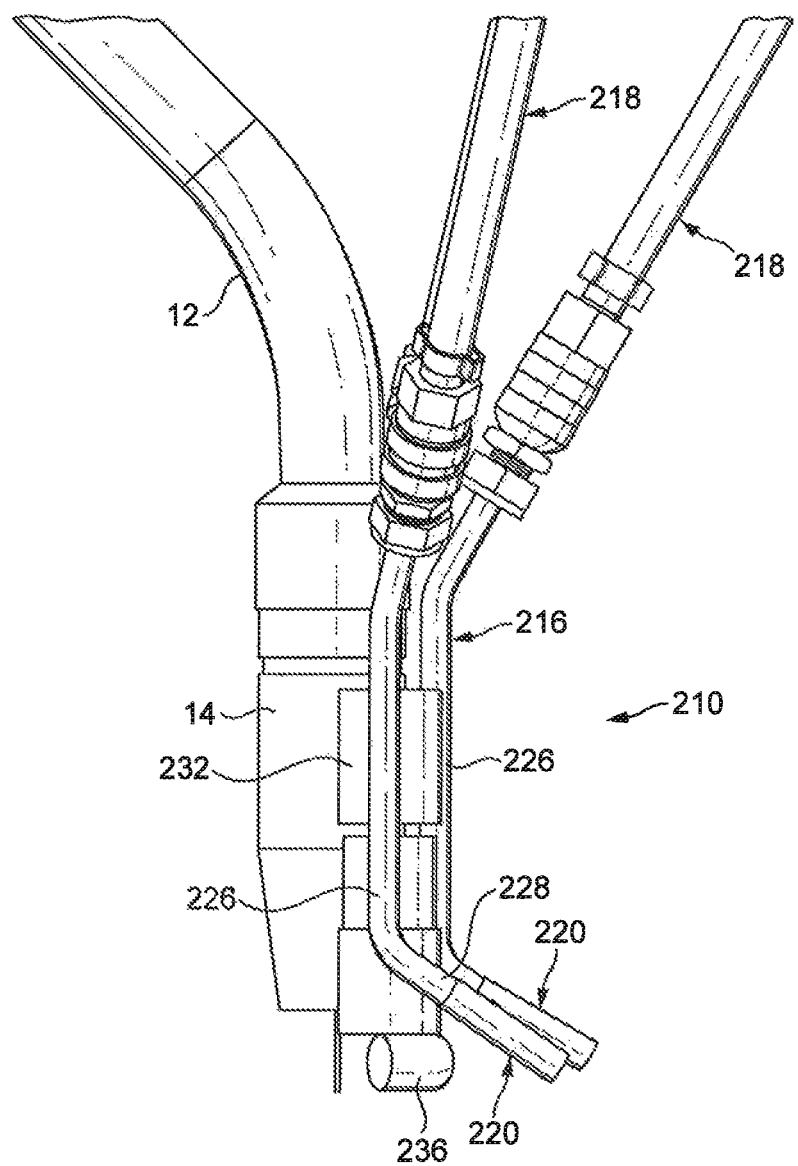
FIG. 12 is a side view of a second alternative embodiment of welding apparatus according to the present invention and including a coolant shield.
Figure 13:
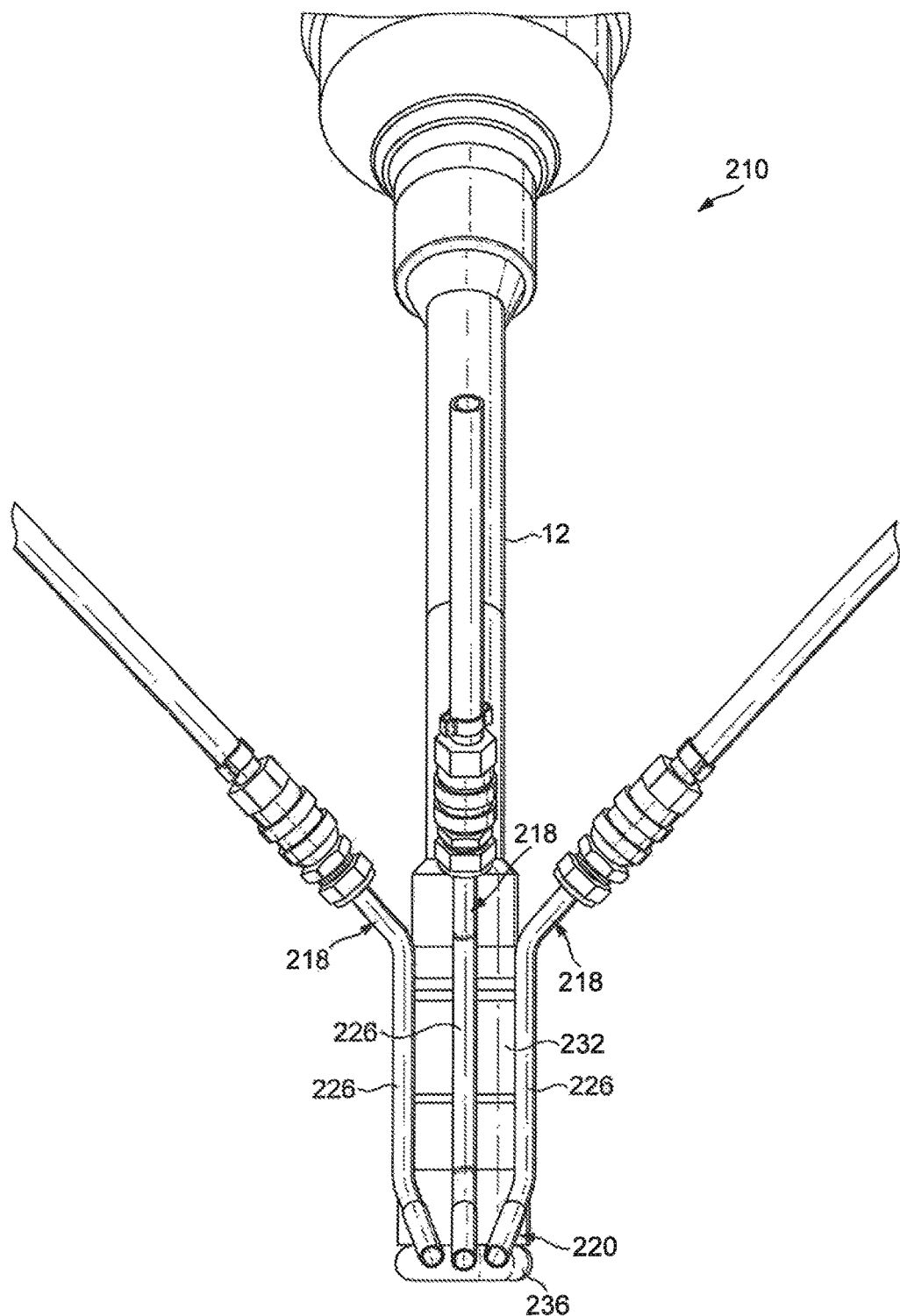
FIG. 13 is a rear view of the welding apparatus of FIG. 12.
Figure 14:
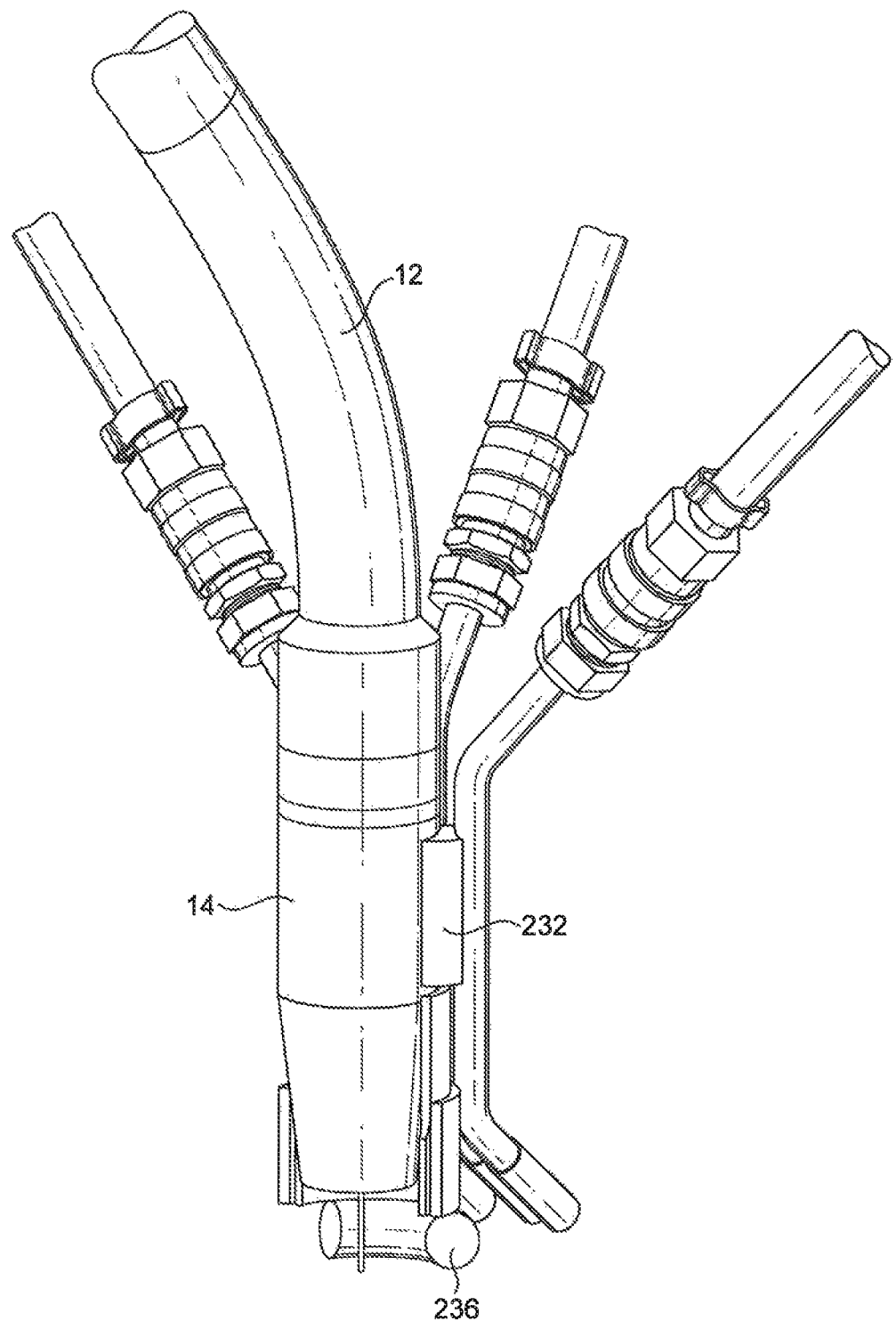
FIG. 14 is a side perspective view of the welding apparatus of FIG. 12.
Figure 15:
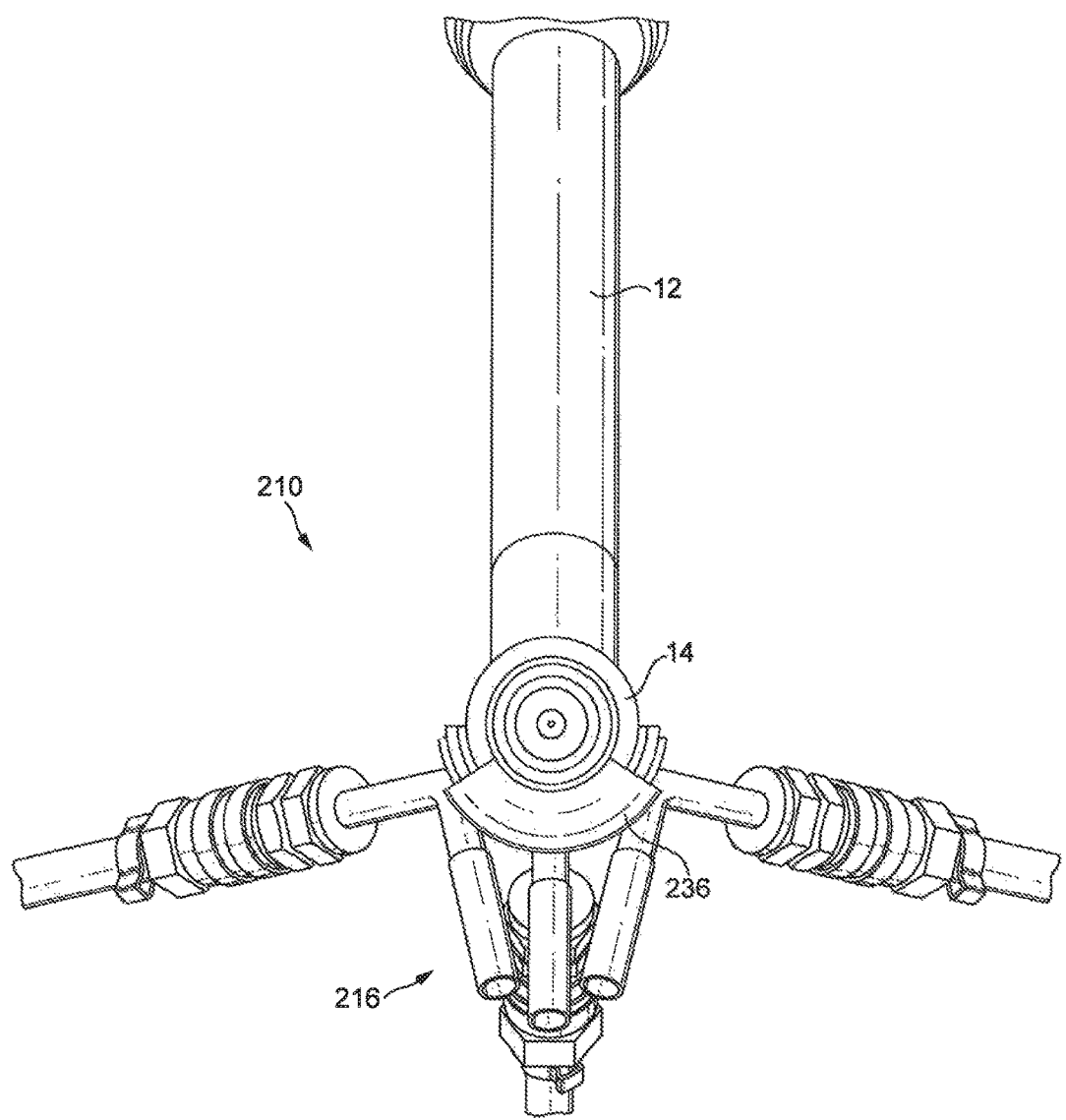
FIG. 15 is a bottom view of the welding apparatus of FIG. 12.

FIGS. 9 to 11 show a welding apparatus 110 according to a further embodiment of the present invention. Welding apparatus 110 is similar to welding apparatus 10. However, rather than having a single coolant delivery conduit and a single coolant nozzle, weld cooling apparatus 116 has two coolant delivery conduits 118, one on each side of the welding nozzle 14 and each having a coolant nozzle 120. As with welding apparatus 10, each coolant delivery conduit 118 is formed from a cylindrical tube which is bent at an elbow 124 to form a first cylindrical tube portion 126 extending alongside the welding nozzle 14 and a second cylindrical tube portion 128 which extends downwardly and is angled away from the first cylindrical tube portion 126 and to the distal end of which the coolant nozzle 120 is attached. However, since the first cylindrical tube portions 126 are on either side of the welding nozzle 14, the second cylindrical tube portions are angled towards one another so that the jets of cryogenic coolant issued from the nozzles 120 are convergent.

FIGS. 12 to 15 show a welding apparatus 210 according to a further embodiment of the present invention. Welding apparatus 210 is similar to welding apparatuses 10 and 110 but has three coolant delivery conduits 218, each having a coolant nozzle 220. The coolant delivery conduits 218 are arranged with one central conduit, similar to coolant delivery conduit 18 of the first embodiment, and with the remaining two conduits on either side of the central conduit. As with welding apparatus 110, the second cylindrical tube portions 228 of the coolant delivery conduits 218 at either side are angled towards one another so that the jets of cryogenic coolant issued from the nozzles 220 are convergent. Additionally, and unlike welding apparatuses 10 and 110, weld cooling apparatus 216 is mounted on the welding tool 12 using a connection member 232 which attaches the first cylindrical tube portions 226 of each coolant delivery conduit 218 to the rear side of welding nozzle 14, such that the weld cooling apparatus 216 and welding tool 12 are integrated. An arcuate shield 236 extends downwards from the connection member 232 and is co-axial with the welding nozzle 14, with its open side facing away from the coolant nozzles 220. The shield 236 is compliant, is formed from a high temperature resistant material (alumina-silica rope, the outer skin can be made of flame and fire resistant ceramic, woven, alumino-silica based fibre cloth) and, like shield 36, forms a barrier between the ejected coolant and the welding nozzle 14 to reduce the amount of coolant gas which may disturb or interfere with the shielding gas.

Although the invention has been described above with reference to one or more preferred embodiments, it will be appreciated that various changes or modifications may be made without departing from the scope of the invention as defined in the appended claims.

For example, while the preferred embodiments of the invention have been described for use in conjunction with conventional arc welding methods, (such as MIG welding, TIG welding and plasma arc welding) they may also be used to provide cooling to any other thermal joining process. For example the invention may also be used in conjunction with solid phase welding, such as friction stir welding, so as to reduce or eliminate distortion or to modify the microstructure of the weld metal.

Additionally, although welding apparatuses 10 and 110 are described as using a clamp 32, 132 and welding apparatus 210 is described as using a connection member 232 to fix the weld cooling apparatuses 16, 116 and 216 to the welding nozzle 14, the clamp and the connection member are interchangeable and may be used with any of the embodiments. Further, other mounting arrangements are also envisaged, such as, but not limited to, brazing, welding clipping, or incorporating into a body with a channel. Further, although the embodiments are described as having one, two, or three coolant delivery conduits and associated coolant nozzles, any suitable shape and number, for example four of more, may be used.

Although the coolant delivery conduit 18 is described as comprising a cylindrical tube which is bent at an elbow 24 to form a first cylindrical tube portion 26 extending alongside the welding nozzle 14 and a second cylindrical tube portion 28, the conduit may be any suitable channel or conduit, including but not limited to a cylindrical tube or pipe, or a channel formed through a housing. Additionally, the conduit and/or cylindrical tube may have any suitable cross-sectional shape, such as, but limited to, a circular, elliptical, square, or rectangular cross-section.

Although the coolant nozzle 20 is described as being tapped to a 1BA thread to allow the removable flow regulator 30 to be connected, any suitable means of removable attachment may be used. Additionally, the coolant nozzle 20 can be used without any removable flow regulator.

While the embodiments illustrated in FIGS. 5 and 11-15 include a refractory shield to form a barrier between the ejected coolant and the welding nozzle, such shields can also be used with the other embodiments, or omitted entirely.

The invention claimed is:

1. A welding apparatus comprising a welding tool and a weld cooling apparatus for the forced cooling of a heated weld zone in a workpiece being welded by the welding tool, the welding tool having a welding nozzle with a longitudinal axis, and the weld cooling apparatus comprising: a source of $CO_2$ as coolant; a plurality of coolant delivery conduits arranged to move with the welding tool wherein each of the coolant delivery conduits comprising a first tube portion having a longitudinal axis and extending alongside the welding tool and a second tube portion having a longitudinal axis and extending, in use, downwardly and away from the welding tool; and a plurality of coolant nozzles arranged to direct converging flows of coolant at the heated weld zone at a distal end of the second tube portion having a longitudinal axis and an outlet for ejecting coolant at the heated weld zone; wherein the plurality of coolant delivery conduits are each connected to one of the plurality of coolant nozzles, wherein the second tube portion is arranged such that the coolant nozzle outlet is spaced, in use, from the workpiece so as to direct a jet of coolant behind the welding tool onto the weld zone, and at least 10 mm from the longitudinal axis of the first tube portion.

2. The apparatus as claimed in claim 1, wherein the first tube portion and the second tube portion are arranged such that the coolant nozzle outlet is between 10 mm and 15 mm from the longitudinal axis of the first tube portion.

3. The apparatus as claimed in claim 1, wherein the first tube portion has an outer diameter of less than 10 mm.

4. The apparatus as claimed in claim 1, wherein the first tube portion is confined to an area extending around and at a distance of 10 mm from the welding nozzle.

5. The apparatus as claimed in claim 1, wherein the at least one coolant delivery conduit comprises a cylindrical tube with a bend to form the first and second tube portions.

6. The apparatus as claimed in claim 1, wherein the second tube portion is arranged such that the longitudinal axis of the at least one coolant nozzle is at an angle of 10 to 70 degrees to the longitudinal axis of the welding nozzle to direct coolant away from the welding nozzle.

7. The apparatus as claimed in claim 6, wherein the angle of the at least one coolant nozzle relative to the welding nozzle is adjustable.

8. The apparatus as claimed in claim 1, wherein the first tube portion is fixed to, or integral with, the welding nozzle.

9. The apparatus as claimed in claim 1, wherein the at least one coolant nozzle further comprises a removable flow regulator having a fixed diameter flow regulating orifice.

10. The apparatus as claimed in claim 9, wherein the flow regulating orifice is arranged to limit the flow of coolant therethrough at a rate of between 0.2 kg/min and 12 kg/min.

11. The apparatus as claimed in claim 1, further comprising a compliant shield arranged, when in use, to form a barrier between the ejected coolant and the welding nozzle.

12. The apparatus as claimed in claim 11, wherein the shield is arcuate and disposed around the welding nozzle.

13. The apparatus as claimed in claim 11, wherein the shield is arcuate and disposed around the at least one coolant nozzle.

14. The apparatus as claimed in claim 11, wherein the shield has a circular cross-section through a plane parallel to the longitudinal axis of the welding nozzle.

15. A robotic welding apparatus comprising a robotic arm and a welding apparatus comprising a welding tool and a weld cooling apparatus for the forced cooling of a heated weld zone in a workpiece being welded by the welding tool, the welding tool having a welding nozzle with a longitudinal axis, and the weld cooling apparatus comprising: a source of $CO_2$ as the coolant; a plurality of coolant delivery conduits arranged to move with the welding tool wherein each of the coolant delivery conduits comprising a first tube portion having a longitudinal axis and extending alongside the welding tool and a second tube portion having a longitudinal axis and extending, in use, downwardly and away from the welding tool; and a plurality of coolant nozzles direct converging flows of coolant at the heated weld zone at a distal end of the second tube portion having a longitudinal axis and an outlet for ejecting cryogenic coolant at the heated weld zone; wherein the plurality of coolant delivery conduits are each connected to one of the plurality of coolant nozzles, wherein the second tube portion is arranged such that the coolant nozzle outlet is spaced, in use, from the workpiece so as to direct a jet of coolant behind the welding tool onto the weld zone, and at least 10 mm from the longitudinal axis of the first tube portion.

16. A weld cooling apparatus for use with a welding apparatus, the welding apparatus comprising a welding tool and a weld cooling apparatus for the forced cooling of a heated weld zone in a workpiece being welded by the welding tool, the welding tool having a welding nozzle with a longitudinal axis, and the weld cooling apparatus comprising: a source of $CO_2$ as a coolant; a plurality of coolant delivery conduits arranged to move with the welding tool wherein each of the coolant delivery conduits comprising a first tube portion having a longitudinal axis and extending alongside the welding tool and a second tube portion having a longitudinal axis and extending, in use, downwardly and away from the welding tool; and a plurality of coolant nozzles arranged to direct converging flows of coolant at the heated weld zone at a distal end of the second tube portion having a longitudinal axis and an outlet for ejecting coolant at the heated weld zone; wherein the plurality of coolant delivery conduits are each connected to one of the plurality of coolant nozzles; wherein the second tube portion is arranged such that the coolant nozzle outlet is spaced, in use, from the workpiece so as to direct a jet of coolant behind the welding tool onto the weld zone, and at least 10 mm from the longitudinal axis of the first tube portion, the weld cooling apparatus comprising: a source of $CO_2$ as the coolant; at least one coolant delivery conduit movable with the welding tool and comprising a first tube portion having a longitudinal axis and arranged to extend alongside the welding tool and a second tube portion having a longitudinal axis and arranged to extend, in use, downwardly and away from the welding tool; and at least one coolant nozzle at a distal end of the second tube portion having a longitudinal axis and an outlet for ejecting cryogenic coolant at the heated weld zone; wherein the second tube portion is arranged such that the coolant nozzle outlet is at least 10 mm from the longitudinal axis of the first tube portion.

17. A method of welding a workpiece using a welding apparatus comprising a welding tool and a weld cooling apparatus for the forced cooling of a heated weld zone in a workpiece being welded by the welding tool, the welding tool having a welding nozzle with a longitudinal axis, and the weld cooling apparatus comprising: a source of $CO_2$ as the coolant; a plurality of coolant delivery conduits arranged to move with the welding tool wherein each of the coolant delivery conduits comprising a first tube portion having a longitudinal axis and extending alongside the welding tool and a second tube portion having a longitudinal axis and extending, in use, downwardly and away from the welding tool; and a plurality of coolant nozzles arranged to direct converging flows of coolant at the heated weld zone at a distal end of the second tube portion having a longitudinal axis and an outlet for ejecting coolant at the heated weld zone; wherein the plurality of coolant delivery conduits are each connected to one of the plurality of coolant nozzles; wherein the second tube portion is arranged such that the coolant nozzle outlet is spaced, in use, from the workpiece so as to direct a jet of coolant behind the welding tool onto the weld zone, and at least 10 mm from the longitudinal axis of the first tube portion, the method comprising moving the welding tool across the workpiece in order to generate the heated weld zone; and spraying a jet of $CO_2$ from the coolant nozzle from a location spaced from the workpiece onto the workpiece at a position in the heated weld zone behind the welding tool.

18. The method according to claim 17, further comprising ejecting the $CO_2$ from the coolant nozzle at a temperature of −50° C. or less.

19. The method according to claim 18, further comprising ejecting the $CO_2$ from the coolant nozzle in solid form.

20. The method according to claim 17, wherein a cooling power of the coolant transmitted to the workpiece is 2-30 kW.

21. The method according to claim 17, wherein the height of the coolant nozzle above the workpiece is 5-15 mm.

22. The method according to claim 17, wherein the coolant nozzle emits a jet of $CO_2$ which impinges on the workpiece in a zone which has a maximum width in a direction perpendicular to the direction of travel of the nozzle which is between 12 and 15 mm.

23. The method according to claim 17, wherein the distance between the centre or the weld zone and the centre of a zone on the workpiece which is impinged by the coolant is between 10 to 60 mm.

* * * * *